United States Patent
Qiu et al.

(10) Patent No.: US 11,068,525 B2
(45) Date of Patent: Jul. 20, 2021

(54) NON-TRANSITORY COMPUTER READABLE MEDIUM, INFORMATION PROCESSING APPARATUS, AND INFORMATION PROCESSING METHOD

(71) Applicant: FUJI XEROX CO., LTD., Tokyo (JP)

(72) Inventors: Xule Qiu, Kanagawa (JP); Hiroshi Okamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 970 days.

(21) Appl. No.: 15/692,375

(22) Filed: Aug. 31, 2017

(65) Prior Publication Data
US 2018/0247225 A1 Aug. 30, 2018

(30) Foreign Application Priority Data
Feb. 27, 2017 (JP) .............. JP2017-034888

(51) Int. Cl.
| | |
|---|---|
| *G06F 16/35* | (2019.01) |
| *G06K 9/62* | (2006.01) |
| *G06N 20/00* | (2019.01) |
| *G06F 16/00* | (2019.01) |
| *G06N 7/00* | (2006.01) |
| *G06K 9/00* | (2006.01) |

(52) U.S. Cl.
CPC .............. *G06F 16/35* (2019.01); *G06F 16/00* (2019.01); *G06K 9/00483* (2013.01); *G06K 9/6218* (2013.01); *G06K 9/6226* (2013.01); *G06K 9/6297* (2013.01); *G06N 7/005* (2013.01); *G06N 20/00* (2019.01)

(58) Field of Classification Search
CPC ......... G06F 16/35; G06F 16/00; G06N 20/00; G06N 7/005; G06K 9/00483; G06K 9/6218; G06K 9/6226; G06K 9/6297
See application file for complete search history.

(56) References Cited

U.S. PATENT DOCUMENTS

| 9,679,247 B2* | 6/2017 | Koutra ................... G06N 5/048 |
| 2014/0136557 A1* | 5/2014 | Lilienthal ................. G06F 7/58 |
| | | 707/754 |

FOREIGN PATENT DOCUMENTS

| JP | 2013-168127 A | 8/2013 |
| JP | 2016-029526 A | 3/2016 |
| JP | 2016-218531 A | 12/2016 |

OTHER PUBLICATIONS

Feb. 9, 2021 Office Action issued in Japanese Patent Application No. 2017-034888.
(Continued)

*Primary Examiner* — Eric Nilsson
(74) *Attorney, Agent, or Firm* — Oliff PLC

(57) ABSTRACT

A non-transitory computer readable medium storing a program causing a computer to execute a process for information processing, the process including: obtaining input data that represents attributes of each subject among subjects; generating a bipartite network which includes the subjects and the attributes included in the input data as nodes and in which a node that corresponds to each subject among the subjects are connected to nodes that correspond to the attributes of the subject via links; and performing clustering of a group of the nodes by performing iterative calculations of a stochastic process of transitions between the nodes via the links in the bipartite network.

21 Claims, 6 Drawing Sheets

(56) References Cited

OTHER PUBLICATIONS

Xule Qiu et al., "Random Walk based Community Detection from Bipartite Networks", thirtieth Civil competition Paper Collection, The Japanese Society for Artificial Intelligence, Jun. 6, 2016.
Ikehara Tetsuya et al., "Heterogeneous machine learning using online learning techniques", technical research report of Institute of Electronics, Information and Communication Engineers, Nov. 9, 2016, vol. 116, No. 300, pp. 59-64.

* cited by examiner

| WORD ID<br>DOCUMENT ID | w1 | w2 | w3 | w4 | w5 | ..... | wn |
|---|---|---|---|---|---|---|---|
| D1 | 1 | 1 | 0 | 0 | 1 | ..... | 0 |
| D2 | 1 | 1 | 1 | 0 | 0 | ..... | 0 |
| D3 | 0 | 1 | 1 | 1 | 1 | ..... | 0 |
| D4 | 0 | 0 | 0 | 1 | 1 | ..... | 1 |
| .... | ... | ... | ... | ... | ... | ..... | ... |

FIG. 5
| CLUSTER ID / SUBJECT ID | $C_1$ | $C_2$ | $C_3$ | $C_4$ | ..... | $C_K$ |
|---|---|---|---|---|---|---|
| 1 | 0 | 1 | 0 | 1 | ..... | 0 |
| 2 | 1 | 0 | 0 | 0 | ..... | 0 |
| 3 | 0 | 1 | 0 | 0 | ..... | 0 |
| 4 | 1 | 0 | 0 | 0 | ..... | 1 |
| .... | ... | ... | ... | ... | ..... | ... |
FIG. 6
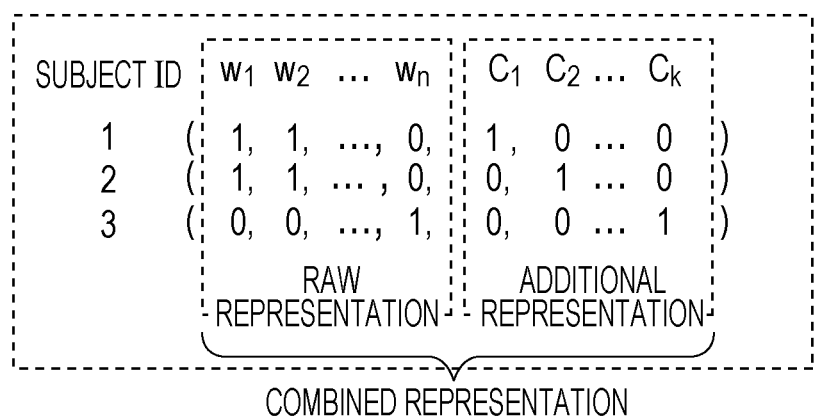
FIG. 7
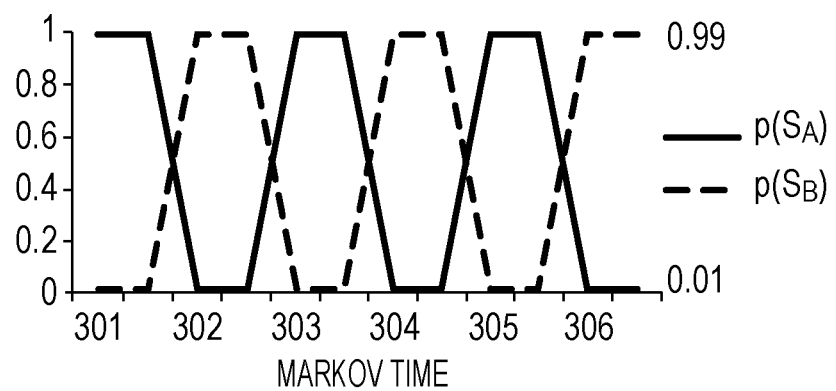

FIG. 9

| ATTRIBUTE ID \ CLUSTER ID | $C_1$ | $C_2$ | $C_3$ | $C_4$ | ..... | $C_K$ |
|---|---|---|---|---|---|---|
| $\omega_1$ | 0 | 0.5 | 0 | 0.1 | ..... | 0 |
| $\omega_2$ | 0.9 | 0 | 0 | 0 | ..... | 0 |
| $\omega_3$ | 0 | 0.3 | 0 | 0 | ..... | 0 |
| $\omega_4$ | 0.2 | 0 | 0 | 0.4 | ..... | 0.1 |
| .... | ... | ... | ... | ... | ..... | ... |

NON-TRANSITORY COMPUTER READABLE MEDIUM, INFORMATION PROCESSING APPARATUS, AND INFORMATION PROCESSING METHOD

CROSS-REFERENCE TO RELATED APPLICATIONS

This application is based on and claims priority under 35 USC 119 from Japanese Patent Application No. 2017-034888 filed Feb. 27, 2017.

BACKGROUND

(i) Technical Field

The present invention relates to a non-transitory computer readable medium, an information processing apparatus, and an information processing method.

(ii) Related Art

It is a common practice to mechanically extract the values of the attributes of a subject (analysis target) from raw data about the subject and to use a set of the values of the attributes as a feature representation that represents the features of the subject. For example, as a feature representation of a document, a vector that represents the frequency of appearance of each word in the document is used. This is a commonly known practice.

An analysis technique in which clustering of feature representations of subjects obtained from raw data is performed is commonly used. In a clustering technique according to the related art, in general, feature representations obtained from raw data of subjects are regarded as vectors, and clustering is performed on the basis of the distance between the feature representation vectors in a vector space.

SUMMARY

According to an aspect of the invention, there is provided a non-transitory computer readable medium storing a program causing a computer to execute a process for information processing, the process including: obtaining input data that represents attributes of each subject among subjects; generating a bipartite network which includes the subjects and the attributes included in the input data as nodes and in which a node that corresponds to each subject among the subjects are connected to nodes that correspond to the attributes of the subject via links; and performing clustering of a group of the nodes by performing iterative calculations of a stochastic process of transitions between the nodes via the links in the bipartite network.

BRIEF DESCRIPTION OF THE DRAWINGS

An exemplary embodiment of the present invention will be described in detail based on the following figures, wherein:

FIG. 5 is a diagram illustrating example clustering results about subjects;

FIG. 6 is a diagram illustrating example feature representations generated by a feature representation generation unit;

FIG. 7 is a diagram for describing an issue of a probability switch;

FIG. 9 is a diagram illustrating example feature representations of attributes stored in an attribute feature storage unit.

DETAILED DESCRIPTION

Hereinafter, an exemplary embodiment of the present invention will be described with reference to the drawings.

Figure 1:
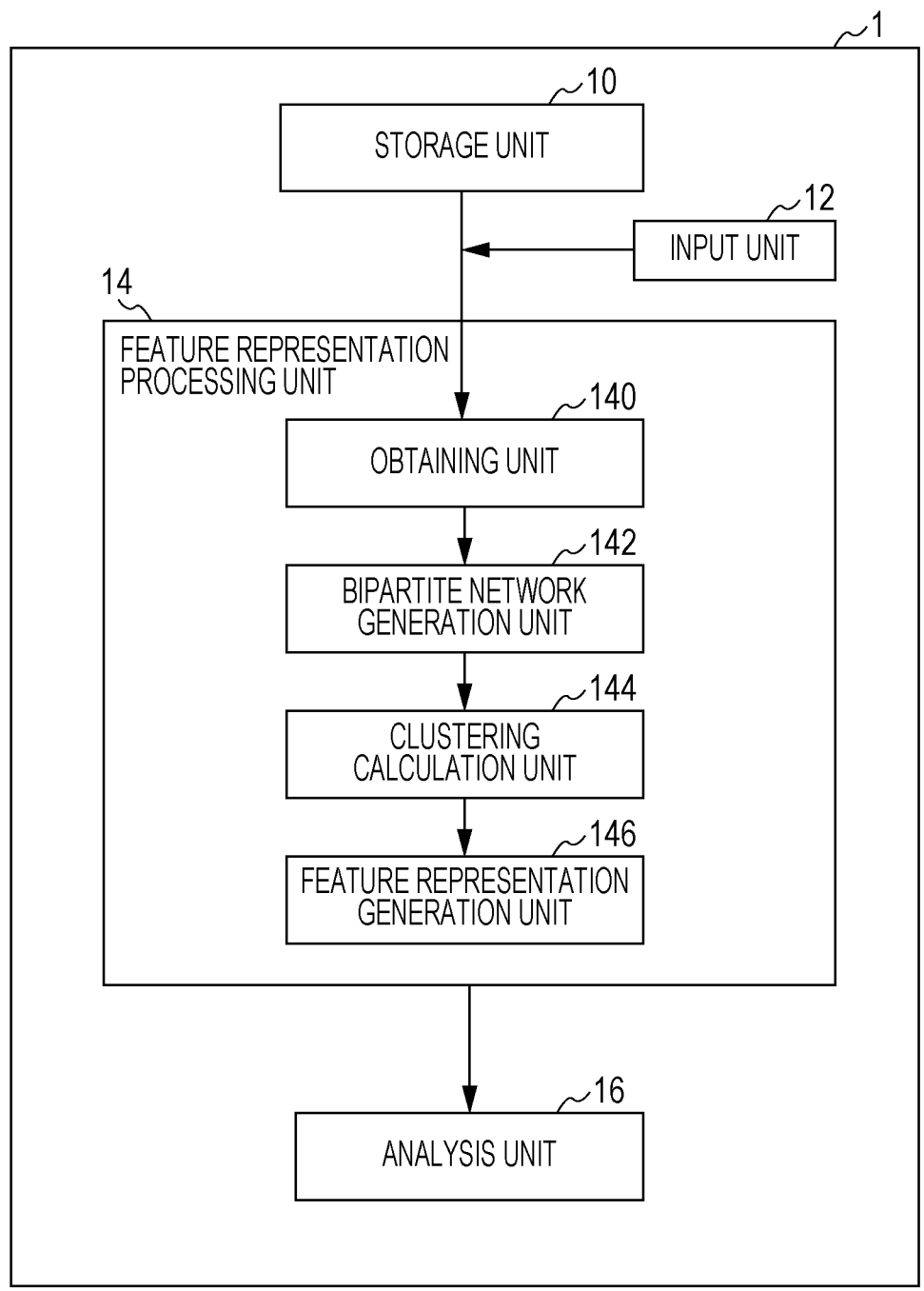
FIG. 1 is a diagram illustrating an example apparatus configuration according to an exemplary embodiment.

FIG. 1 is a diagram illustrating a configuration of an information processing apparatus 1 according to an exemplary embodiment of the present invention. The information processing apparatus 1 includes a storage unit 10, an input unit 12, a feature representation processing unit 14, and an analysis unit 16.

The storage unit 10 includes, for example, a random access memory (RAM) and a read-only memory (ROM). The storage unit 10 stores a program that is executed by the feature representation processing unit 14, and functions as a work memory of the feature representation processing unit 14. The program stored in the storage unit 10 and executed by the feature representation processing unit 14 may be a program that is provided via a communication line or may be a program that is stored in a computer-readable information storage medium, such as a semiconductor storage element, and provided.

The storage unit 10 of the information processing apparatus 1 according to this exemplary embodiment stores data of raw feature representations (hereinafter referred to as "raw representations") extracted from raw data.

Raw data is data that includes information about the attributes of each subject, which is an analysis target, the attributes making up the features of the subject. There are no restrictions on the data content, the data format, and so on. Text data, such as an electronic document (hereinafter simply referred to as "document"), is an example of raw data. In this case, each document is regarded as a subject, which is an analysis target, and individual words included in the document are regarded as individual attributes of the subject. Further, relational data, such as a database to which purchase histories of individuals are recorded, and context data are examples of raw data. In the case of a purchase history database, each of the individuals is a subject, which is an analysis target, and individual items purchased by the subject and recorded to the database are the individual attributes of the subject. Determination as to which of the information items obtained from raw data is to be regarded as a subject and which of the information items obtained from the raw data is to be regarded as an attribute of the subject is a matter that is to be specified as appropriate in accordance with the analysis purpose, and the descriptions given above are only examples.

Figures 2, 3:
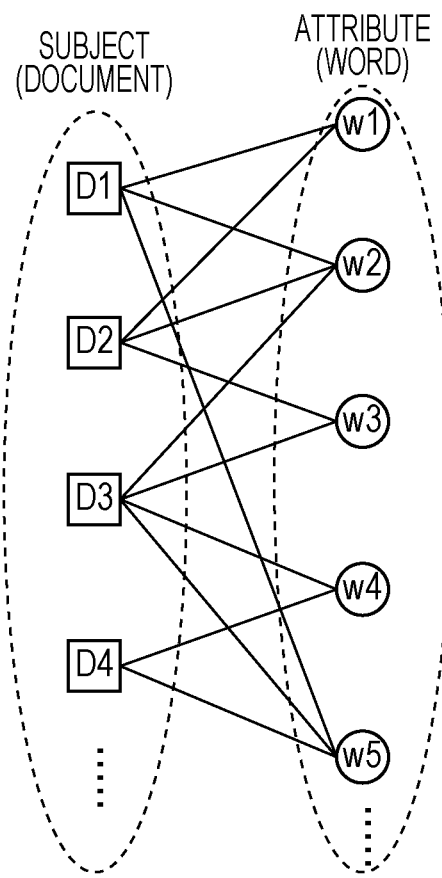
FIG. 2 is a diagram illustrating example raw feature representations obtained from raw data.
FIG. 3 is a diagram illustrating an example bipartite network of subjects and attributes.

A raw representation is information that indicates relationships between a subject and attributes extracted from raw data. FIG. 2 illustrates example raw representations extracted from a group of documents. In each of the raw representations in FIG. 2, whether each word, which is an attribute, is included (value "1") or not (value "0") in the document, which is a subject, is indicated in association with the document ID (identification information) of the document. That is, the features of each subject (document) are represented by a vector composed of the values of the attributes (words). Similarly, as an example of a raw representation obtained from purchase history data, data in which a vector that indicates whether each item has been purchased by a person is associated with the ID of the person may be used.

In the example in FIG. 2, the value of each attribute is represented by binary data that indicates whether the subject has the attribute; however, this is only an example. The value of each attribute is a matter that is specified as appropriate in accordance with the analysis purpose. For example, as the value of each attribute of a document, a value that corresponds to the frequency of appearance of the attribute (word) in the document may be used instead of binary data as illustrated in FIG. 2.

It is possible to generate raw representations from raw data by using a technique according to the related art, and this exemplary embodiment assumes that generated raw representations are stored in advance in the storage unit 10. As a matter of course, the apparatus according to this exemplary embodiment or another apparatus may generate raw representations from raw data when performing an analysis.

The input unit 12 is, for example, a keyboard or a mouse, and transmits user instructions to the feature representation processing unit 14.

The feature representation processing unit 14 includes, for example, a central processing unit (CPU) and executes a program stored in the storage unit 10 to thereby perform a process for generating a new feature representation of each subject from a raw representation. A new feature representation is generated by performing clustering of the raw representation. That is, clustering of subjects represented by raw representations is performed, and information about clusters, obtained as a result of clustering, to which each subject belongs is regarded as new features of the subject. In this exemplary embodiment, for a network generated from raw representations, clustering is performed on the basis of modular decomposition of the network as proposed in, for example, Japanese Unexamined Patent Application Publication Nos. 2013-168127, 2016-029526, and 2016-218531 (hereinafter respectively referred to as PTL 1, 2, and 3) to thereby implement clustering of the subjects (details will be described below).

The analysis unit 16 uses feature representations generated by the feature representation processing unit 14 to analyze the subjects. The analysis unit 16 performs an analysis by using a technique according to the related art. A description of the analysis is omitted.

The feature representation processing unit 14 is further described in detail.

In clustering according to the related art, the features of each subject represented by a raw representation, that is, a vector of the values of the attributes, are assumed to indicate the position of the subject in a vector space, and the subjects in a group are divided into plural clusters in accordance with the closeness between the positions of the subjects. However, in such clustering based on the distance between the feature vectors, relationships between the attributes of the vectors are not reflected in the clustering.

Further, a raw representation is often very sparse, and it is difficult to correctly perform clustering of very sparse vectors on the basis of the distance between the vectors. For example, in a case of analyzing tweets posted on Twitter (registered trademark), a very wide variety of words (for example, several thousands to several tens of thousands of words) are included in the group of tweets. If such a variety of words are used as the components of each vector (attributes), each tweet includes only limited words (several tens of words at the maximum) among the variety of words. Therefore, a vector of a feature representation that represents each tweet has a value (for example, 1) larger than 0 for only the limited words included in the tweet and has a value of 0 for the large majority of the words other than the limited words, that is, the vector is a very sparse vector.

Clustering according to the related art based on the distance between vectors depends too much on the distance between vectors. That is, the closeness between vectors changes in accordance with preprocessing performed for vector generation and so on, and therefore, it is not possible to obtain a highly reliable result with clustering depending on only the distance.

The feature representation processing unit 14 forms, from raw representations, a bipartite network that includes subjects and attributes as nodes, and performs clustering of the bipartite network on the basis of modular decomposition of the network instead of performing clustering of the raw representations on the basis of the distance between vectors.

The feature representation processing unit 14 functionally includes an obtaining unit 140, a bipartite network generation unit 142, a clustering calculation unit 144, and a feature representation generation unit 146.

The obtaining unit 140 obtains data of raw representations from the storage unit 10.

The bipartite network generation unit 142 generates, from the data of the raw representation, a bipartite network that includes subjects and attributes as nodes. A bipartite network is also called a bipartite graph and is a network (graph) in which the set of nodes is divided into two subsets and in which there is no link that connects nodes in the same subset. The bipartite network generation unit 142 generates a bipartite network that includes a group of nodes of subjects and a group of nodes of attributes as separate subsets.

A bipartite network generated from the raw representation data illustrated in FIG. 2 is illustrated in FIG. 3. In FIG. 3, each square represents a node indicating a document, which is a subject, and each circle represents a node indicating a word, which is an attribute. Each straight line that connects a node of a subject with a node of an attribute represents a link. This bipartite network is generated by, for example, connecting a node of a document with a node of a word for which the value is 1 in the raw representations illustrated in FIG. 2 via a link. In the bipartite network, there is no link that connects a node of a document and a node of a word for which the value is 0.

In a case where the value of each attribute of a raw representation is not a binary value as in FIG. 2 but a positive multi-level value, such as the frequency of appearance of a word, a node of a subject is connected to a node of an attribute having a positive value for the subject via a link, and a link that connects a node of a subject with a node of an attribute having a value of 0 for the subject is not provided to thereby form a bipartite network. In this case, a multi-level value may be used as information that indicates the strength of the link. The strength of a link may be reflected to, for example, the probability of a transition via the link (that is, a transition probability matrix $T_{nm}$ described below) in clustering calculation described below (for example, as the strength of a link increases, the value of the transition probability of the link is increased).

The clustering calculation unit 144 performs clustering calculation for the bipartite network, which is a target, generated by the bipartite network generation unit 142 by using a technique for modular decomposition of the network. The modular decomposition of the network is expressed by expression 1 below.

$$p(n)\Sigma_{k=1}{}^{K}\pi_{k}(n|k)(\Sigma_{k}\pi_{k}=1) \quad \text{expression 1}$$

where $\pi_k$=Priori probability of cluster (community), and p(n|k)=Probability distribution of node in cluster.

In expression 1, p(n) represents the probability of a node n (the probability that a random walker is present for the node), and $\pi_k$ represents the priori probability of a cluster (community) k and indicates the degree of importance of the cluster k. The sum of $\pi_k$ for k is 1, p(n|k) represents the probability of the node n in the cluster k, and K represents the total number of clusters k. Expression 1 shows that the probability p(n) of the node n is decomposed into combinations of the probabilities p(n|k) of the node n in the respective clusters k.

A specific calculation technique used by the clustering calculation unit 144 may be, for example, a technique similar to those described in PTL 1 to 3. As a specific calculation process, an example process based on an idea similar to techniques described in PTL 2 and 3 is described below with reference to FIG. 4.

Figure 4:
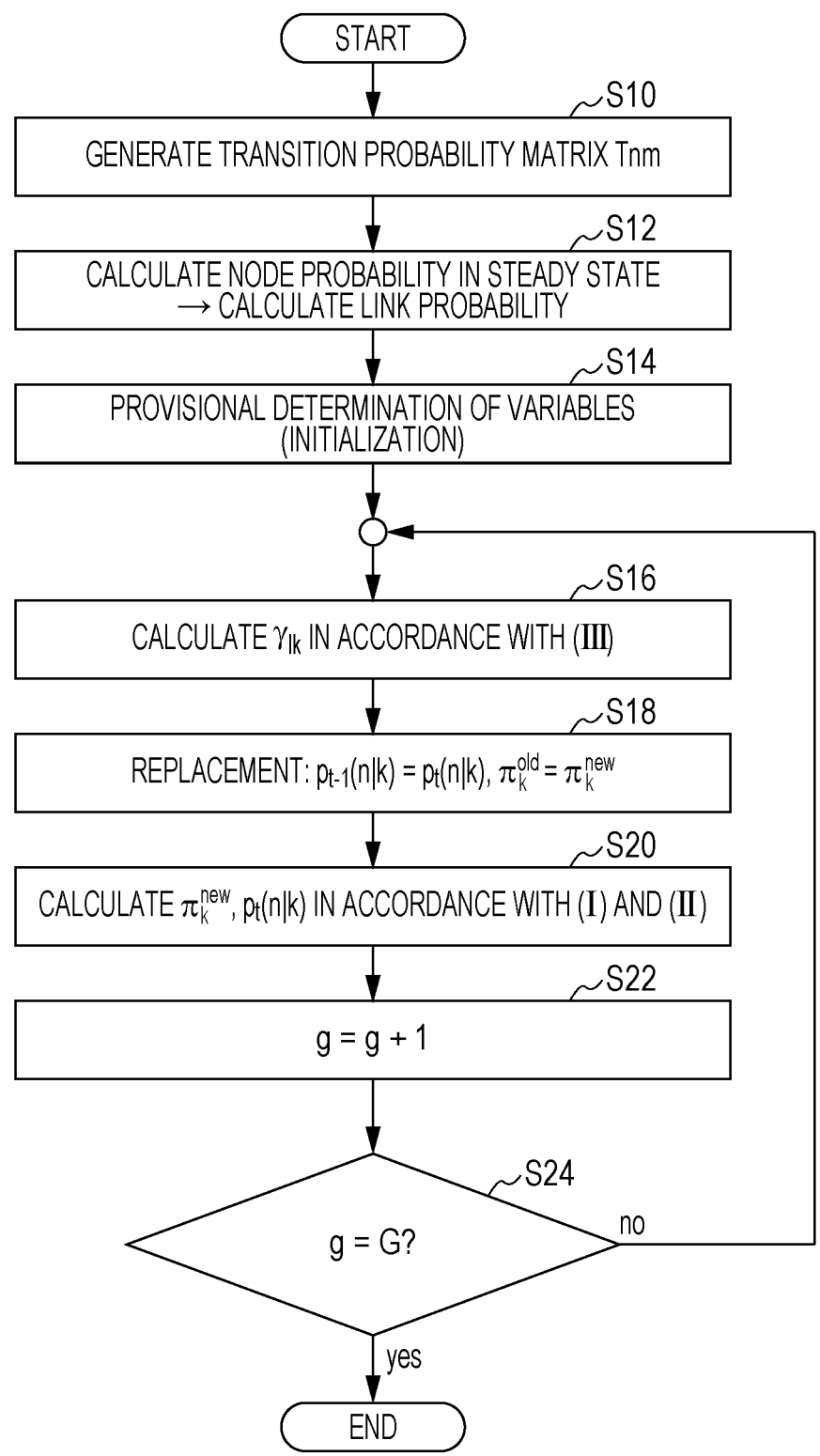
FIG. 4 is a diagram illustrating an example process performed by a clustering calculation unit.

In the procedure in FIG. 4, the clustering calculation unit 144 first generates a transition probability matrix $T_{nm}$ for the bipartite network generated by the bipartite network generation unit 142 (S10). Here, the transition probability matrix $T_{nm}$ is a matrix that represents the probability that an agent (in other words, the probability value of a node m) transitions (random-walks) from the node m to a node n along a link in the network (that is, the transition probability). For example, if it is assumed that the agent selects one or more links extending from a node with equal probability, the transition probability matrix depends only on the structure of the network indicated by network information, that is, depends only on how the nodes are linked. As a matter of course, it is possible to calculate the transition probability matrix $T_{nm}$ by taking into consideration information other than information about the network structure (for example, the degrees of importance of the nodes or the strength of the links). Also in this case, the transition probability matrix $T_{nm}$ is based on the network information. In the case of a bipartite network, there is no link connecting nodes that belong to the same subset, and therefore, the transition probability of a transition between nodes in the same subset is 0 in the transition probability matrix $T_{nm}$. Regarding the transition probability matrix, please refer to PTL 1 to 3 for further details.

Next, the clustering calculation unit 144 calculates a steady link probability (S12).

In this calculation, the transition probability matrix $T_{nm}$ obtained in S10 is used to first calculate the probability of each node (the node probability in the steady state) when probability transitions (random walks) in the bipartite network are in the steady state. In the calculation, for example, expression 2 below is repeatedly calculated until the steady state is attained.

$$p_t(n)\Sigma_{m=1}{}^{N}T_{nm}p_{t-1}(m) \quad \text{expression 2}$$

In expression 2, $p_t(n)$ is the probability of the node n at a discrete time t. Expression 2 is repeatedly calculated, and the value of $p_t(n)$ when the steady state is attained is the node probability $p^{stead}(n)$ of the node n in the steady state.

Next, the clustering calculation unit 144 calculates the link probability in the steady state from the node probability $p^{stead}(n)$ of each node n in the steady state by using expression 3 below.

$$p^{stead}(l)=T_{(\text{terminal end of link } l|\text{initial end of link } l)}p^{stead}\text{(initial end of link } l) \quad \text{expression 3}$$

The link probability is a value obtained by multiplying the node probability $p_t(n)$ by the transition probability of a link l extending from the node. The link probability of the link l in the steady state (the left side of expression 3) is a value obtained by multiplying the node probability of a node that is the initial end of the link l in the steady state by the transition probability of a transition from the initial end node of the link l to the terminal end node of the link l, the transition probability being included in the transition probability matrix $T_{nm}$.

In PTL 2 and PTL 3, passage information $\tau_n^{(d)}$ (where d is an integer from 1 to D, and n is a node identification number), which is observation data obtained by performing D virtual observations, is used as learning data. In an example described below, passage information regarding the actual link l defined by expression 4 below is used instead of $\tau_n^{(d)}$ under a reasonable assumption that the number of observations D is sufficiently large (much larger than the number of nodes N).

$$\tilde{\tau}_n^{(l)}=\delta_{n,\text{terminal end of link } l}+\delta_{n,\text{initial end of link } l}(l=1,\ldots l). \quad \text{expression 4}$$

Here, n is the node identification number, and δ is the Kronecker delta). That is, passage information (learning data) regarding the actual link l of the node n defined by expression 4 has a value of 1 if the node n matches the terminal end of the actual link l or the initial end of the actual link l, otherwise has a value of 0. The clustering calculation unit 144 generates such passage information from information about the bipartite network as learning data. The generated passage information is used in calculations of an expectation-maximization (EM) algorithm described below.

In this example, a proportion $\tilde{\gamma}_{lk}$ (with a tilde) defined by expression (III) below regarding the actual link l is used instead of a proportion $\gamma^{(d)}(k)$, which is the proportion of the cluster k to all of the plural clusters (components) in the d-th virtual observation described in PTL 2 and so on.

The observation number d is replaced by the actual link number l as described above, and the expression of the sum for a function is replaced as follows.

$$\Sigma_{d=1}{}^{D}f(d) \rightarrow D\Sigma_{l=1}{}^{L}\tilde{p}_l{}^{stead}f(l)$$

The second term on the right side of expression (I) described below is obtained by performing such a replacement for a similar expression described in PTL 2 and so on.

Referring back to the procedure in FIG. 4, the clustering calculation unit 144 provisionally determines the initial values of the probability $p_t(n|k)$, the degree of importance $\pi_k^{new}$, and the proportion $\gamma_{lk}$ and initializes a counter g for counting the number of iterations to 0 (S14). The probability $p_t(n|k)$ is the probability of the node n in the cluster k. The degree of importance $\pi_k^{new}$ is the degree of importance of the cluster k. The proportion $\gamma_{lk}$ is the proportion of the cluster k to all of the plural clusters for the link l.

Next, the clustering calculation unit 144 performs iterative calculations of an EM algorithm by using expressions (I), (II), and (III) below.

$$p_t(n|k) = \frac{\tilde{\alpha}}{\tilde{\alpha}+\pi_k^{new}}\sum_{m=1}^{N}T_{nm}p_{t-1}(m|k)+\frac{1}{\tilde{\alpha}+\pi_k^{new}}\cdot\frac{1}{2}\cdot\sum_{l=1}^{L}p^{stead}(l)\gamma_{lk}\tilde{\tau}_n^{(l)} \quad \text{(I)}$$

-continued $$\pi_k^{new} = \sum_{l=1}^{L} p^{stead}(l)\gamma_{lk} \quad \text{(II)}$$

where $\tilde{\alpha} = \dfrac{\alpha}{2D}$ $$\gamma_{lk} \equiv p(z_k^{(l)} = 1 \mid \tilde{\tau}^{(l)}) = \dfrac{\pi_k^{old} \prod_{n=1}^{N} [p_t(n\mid k)]^{\tau_n^{(l)}}}{\sum_{k=1}^{K} \pi_k^{old} \prod_{n=1}^{N} [p_t(n\mid k)]^{\tau_n^{(l)}}} \quad \text{(III)}$$

That is, the clustering calculation unit 144 first calculates the proportion $\gamma_{lk}$ by using expression (III), which is an expectation (E) step in the EM algorithm (S16). In the first iteration in the iterative calculations, the clustering calculation unit 144 uses the initial values provisionally determined in S14.

Next, the clustering calculation unit 144 performs replacements to set $p_{t-1}(n|k)$ and $\pi_k^{old}$, which are the values at the previous time, as the current probability $p_t(n|k)$ and the current degree of importance $\pi_k^{new}$ (S18). Then, the clustering calculation unit 144 calculates the probability $p_t(n|k)$ and the degree of importance $\pi_k^{new}$ in accordance with expressions (I) and (II), which is a maximization (M) step in the EM algorithm (S20). More specifically, in S20, the clustering calculation unit 144 first calculates the new degree of importance $\pi_k^{new}$ in accordance with expression (II), and thereafter, calculates expression (I) by using the new degree of importance to thereby calculate the probability $p_t(n|k)$. Here, $\alpha$ is a positive real number and a parameter for specifying the size of a cluster, and a predetermined value needs to be used.

The clustering calculation unit 144 increments the counter g for counting the number of iterative calculations by one (S22), and determines whether the counter g reaches a predetermined value G (S24). If the counter g does not reach G (no in S24), the process from S16 to S22 is repeated. The value G is the number of iterations needed for the calculations from S16 to S20 to converge in the calculation technique according to this exemplary embodiment and is determined in advance in accordance with an experiment, experiential knowledge, and so on.

If it is determined in S24 that the counter g reaches the value G (yes in S24), the clustering calculation unit 144 determines that the iterative calculations have converged, and ends the process.

After the determination result Yes has been obtained in S24, the clustering calculation unit 144 calculates a degree of belonging γ(k|n), which is a degree to which the node n belongs to the cluster k, in accordance with the following expression.

$$\gamma(k\mid n) = \dfrac{\pi_k \cdot p(n\mid k)}{\sum_{k=1}^{K} \pi_k \cdot p(n\mid k)}$$

In this expression, $\pi_k$ and p(n|k) are $\pi_k^{new}$ and $p_t(n|k)$ finally obtained by repeatedly performing the calculations of the EM algorithm (from S16 to S20). This expression is an expression for calculating a degree to which the node n belongs to the cluster k (degree of belonging) from $\pi_k$ and p(n|k) by using the Bayes theorem.

The clustering calculation unit 144 outputs the degree of belonging γ(k|n) thus calculated as a clustering result. The degree of belonging γ(k|n) is information that indicates the result of soft clustering of the node n.

Alternatively, for example, the clustering calculation unit 144 may binarize the degree of belonging γ(k|n) on the basis of a predetermined threshold and may output the resulting value as a clustering result. This clustering result indicates that the node n belongs to the cluster k for which the degree of belonging γ(k|n) has a value equal to or larger than the threshold (the resulting value of binarization is 1). For the node n, there may be plural clusters k for which the result of binarization is 1 depending on the value of the determined threshold. This is regarded as the result of a sort of soft clustering. Example clustering results that are binarized as described above are illustrated in FIG. 5. In the example, it is determined that a subject having a subject ID 1 belongs to two clusters, namely, a cluster having a cluster ID $C_2$ and a cluster having a cluster ID $C_4$. The subject ID corresponds to the node number n, and the cluster ID corresponds to the cluster number k.

The clustering calculation unit 144 may extract and output, as the final clustering results, the clustering results of only several important clusters among the clustering results of all K clusters (where K is the total number of clusters, k=1 to K) that are used in the iterative calculations. The important clusters need to be determined on the basis of the degree of importance $\pi_k$. For example, a cluster k for which the degree of importance $\pi_k$ that is finally obtained when the iterative calculations have converged is equal to or larger than a predetermined threshold may be extracted as an important cluster, or a cluster k having the degree of importance $\pi_k$ that is ranked in a predetermined place or above from the top may be extracted as an important cluster.

In the determination of convergence in S24, instead of using the method illustrated in FIG. 4, a method similar to those described in PTL 1 to 3 may be used in which it is determined that the iterative calculations have converged in a case where the amount of change in an evaluation value $Q_t$ in each iteration becomes a very small value (smaller than a threshold).

The procedure in FIG. 4 uses a technique similar to calculation techniques described in PTL 2 and 3; however, a technique similar to a calculation technique described in PTL 1 may be used in clustering of a bipartite network. All of the techniques described in PTL 1 to 3 are techniques for treating a transition of the probability between nodes in a network as a discrete Markov chain; however, a calculation technique based on a continuous Markov process, such as a continuous-time master equation, instead of a discrete Markov chain may be used.

When clustering by the clustering calculation unit 144 is completed as described above, the feature representation generation unit 146 generates a new feature representation for each subject by using the clustering results.

The feature representation generation unit 146 generates information regarding each subject in the clustering results obtained from the clustering calculation unit 144 as a new feature representation of the subject. In this example, a new feature representation of the subject having the subject ID 1 is represented by, for example, a vector (0, 1, 0, 1, . . . , 0) (the number of components of the vector is K) in accordance with the clustering results in FIG. 5. In the case where the clustering results are represented not by a binary value indicating whether or not the subject belongs to each cluster but by the numerical value (a real number equal to or larger than 0 and equal to or smaller than 1) of a degree to which the subject belongs to each cluster (for example, the above-described degree of belonging γ(k|n)), information regarding each subject in the clustering results may be used as a new feature representation of the subject.

Alternatively, for example, the feature representation generation unit 146 may generate a combined representation illustrated in FIG. 6 as a new feature representation of each subject. This combined representation is obtained by combining a raw representation with an additional representation. The additional representation is information regarding each subject in the clustering results obtained from the clustering calculation unit 144.

The data of the new feature representations about the subjects generated by the feature representation generation unit 146 is supplied to the analysis unit 16. The analysis unit 16 uses the feature representations of the subjects to analyze the individual subjects and relationships between the subjects.

Clustering results are also obtained for attributes by calculations performed by the clustering calculation unit 144. Accordingly, the feature representation generation unit 146 may generate feature representations of attributes from the clustering results of the attributes. The generated feature representation of each attribute is, for example, information (for example, a vector representation) indicating whether or not the attribute belongs to each cluster or indicating a degree to which the attribute belongs to each cluster (the value is 0 if the attribute does not belong to the cluster at all), as in the additional representation of a subject.

As described above, in this exemplary embodiment, a bipartite network that includes subjects and attributes as nodes is formed from given raw representations, and iterative calculations of a process of a transition of the probability between nodes are performed for the bipartite network to thereby perform clustering of the nodes.

In the original raw representations, data that indicates relations between attributes is not explicitly included, and therefore, there is no link that directly connects the nodes of attributes with each other in the bipartite network. However, the node of an attribute is connected to the node of a subject that has the attribute via a link and is indirectly connected to the node of another attribute of the subject via the node of the subject. Subjects related to each other are highly likely to have a common attribute, and attributes related to each other are highly likely to belong to a common subject. Therefore, the nodes of attributes that are originally closely related to each other are highly likely to be connected with each other via each of the large number of subject nodes at a distance of two links. Even if there is no direct link that connects the nodes, the attributes are likely to be classified into the same cluster as a result of clustering of the bipartite network. Therefore, even in a case where subjects that are closely related to each other do not have a common attribute, in clustering calculation, the degree of relation between the subjects surfaces by a transition of the probability via another attribute that is highly likely to be classified into the same cluster into which the attribute is classified, and the subjects are likely to be classified into the same cluster. As described above, with the technique according to this exemplary embodiment, it is possible to reflect, in clustering, the relation between attributes, which is not included in a calculation in the clustering technique based on the distance between vectors.

With the above-described method in which a bipartite network of subjects and attributes is formed and clustering of the bipartite network is performed, a relation between a subject and an attribute that is not an attribute of the subject is also reflected in the clustering result. Therefore, even if a raw representation is sparse, a more reasonable clustering result is obtained than that obtained by clustering based on the distance between vectors.

Clustering of a bipartite network of subjects and attributes as described above does not use the distance between vectors, and therefore, the clustering result does not depend too much on the distance between vectors.

Addressing Probability Switch

In iterative calculations of a Markov chain for a bipartite network, the probability of the node of a subject necessarily transitions to the node of an attribute in the next step, and the probability of the node of an attribute necessarily moves to the node of a subject in the next step. Therefore, in each iterative step of calculations, the probability moves back and forth between the node group of subjects and the node group of attributes, and the calculations are highly unlikely to converge (or do not converge).

For example, the example in FIG. 7 illustrates a case where the sum total $p(S_A)$ of the probabilities of nodes belonging to a subset $S_A$ of subject nodes in a bipartite network is 0.99 and where the sum total $p(S_B)$ of the probabilities of nodes belonging to a subset $S_B$ of attribute nodes in the bipartite network is 0.01 at a time point in the initial stage. When a calculation of a Markov chain proceeds by one step from this initial state, $p(S_A)$ becomes equal to 0.01 and $p(S_B)$ becomes equal to 0.99. When the calculation further proceeds by one step, $p(S_A)$ becomes equal to 0.99 and $p(S_B)$ becomes equal to 0.01. Thereafter, the sum total of the probabilities of each of the subsets moves back and forth between the two subsets. The probability of each of the nodes individually changes in accordance with a transition of a probability from another linked node; however, the sum total for each subset has a significantly imbalanced value in each step, and such an imbalance is retained. This imbalance hinders the probability of each node from converging.

The issue described above is called a probability switch. Hereinafter, techniques for addressing the issue of the probability switch are proposed.

In a first technique, the initial values of the probabilities of nodes used in iterative operations of a Markov chain are set so that the sum total of the probabilities of the subject nodes is equal to the sum total of the probabilities of the attribute nodes.

More specifically, for example, the clustering calculation unit 144 determines the initial value $p_0(n)$ of the probability $p_t(n)$ of each node n in the calculation of the node probability in the steady state (iterations of expression 2) in S12 in the procedure in FIG. 4 described above so as to satisfy the restriction condition that the total initial value of the subject node group is equal to the total initial value of the attribute node group (that is, both the total values are equal to 0.5).

Alternatively, for example, the clustering calculation unit 144 provisionally determines the initial value of the probability $p_t(n|k)$ in S14 in the procedure in FIG. 4 on the restriction condition that the total for the subject node group is equal to the total for the attribute node group.

Alternatively, both the initial value of the probability $p_t(n)$ of each node n and the initial value of the probability $p_t(n|k)$ may be determined in accordance with the restriction condition that the total for the subject node group is equal to the total for the attribute node group.

When the initial values are set as described above, an imbalance in the probability between a subset of the subject nodes and a subset of the attribute nodes does not occur, and the hindrance to the convergence due to the probability switch described above is eliminated or reduced.

Here, the initialization is performed so that the total of the initial values of the probabilities of the subject nodes is equal to the total of the initial values of the probabilities of the attribute nodes; however, the totals need not be exactly equal to each other and need to be close to each other such that the totals are regarded as substantially equal to each other. Here, "substantially equal" indicates that the difference between the total of the initial values of the probabilities of the subject nodes and the total of the initial values of the probabilities of the attribute nodes is so small that the calculations of the EM algorithm described above for the bipartite network converge when the calculations are iterated a number of times that is within an allowable range.

In a second technique for addressing the issue of the probability switch, in the clustering calculation, a calculation based on a time-continuous Markov process model instead of a time-discrete Markov chain model is used. Examples of the calculation model based on the continuous Markov process include a continuous-time master equation.

Temporal changes in the probability of a node n in the case of using a continuous-time master equation are expressed by expression 5 below.

$$\lim_{\Delta t \to 0} \frac{p_{t+\Delta t}(n) - p_t(n)}{\Delta t} = -p_t(n) + \sum_m T_{nm} p_t(m) \quad \text{expression 5}$$

From expression 5, expression 6 below is obtained.

$$p_{t+\Delta t}(n) = p_t(n) + \Delta t [\Sigma_{m=1}^N T_{nm} p_t(m) - p_t(n)] \quad \text{expression 6}$$

Here, $\Delta t$ is a very short time longer than 0 and shorter than 1. When $\Delta t$ is equal to 1 in expression 6, expression 6 is the same as expression 2 in the case of a discrete Markov chain described above.

In expression 6, a Dirichlet distribution expressed by the following expression is assumed.

$$P(\vec{p}_{t+\Delta t}(n|k) | \vec{p}_t(n|k)) =$$

$$\frac{1}{Z} \prod_{n=1}^N [p_{t+\Delta t}(n|k)]^{\tilde{\alpha}(p_t(n|k) + \Delta t [\Sigma_{m=1}^N T_{nm} p_t(m|k) - p_t(n|k)])}$$

In this case, mathematical expressions (I') to (III') in the EM algorithm are as follows.

$$p_t(n|k) = \frac{\tilde{\alpha}}{\tilde{\alpha} + \pi_k^{new}} \left[ (1 - \Delta t) p_{t-\Delta t}(n|k) + \Delta t \sum_{m=1}^N T_{nm} p_{t-\Delta t}(m|k) \right] + \quad (\text{I}')$$

$$\frac{1}{\tilde{\alpha} + \pi_k^{new}} \frac{1}{2} \sum_{l=1}^L p^{stead}(l) \gamma(k|l) \tau(n|l)$$

$$\pi_k^{new} = \sum_{l=1}^L p^{stead}(l) \gamma(k|l) \quad (\text{II}')$$

Where $\tilde{\alpha} = \frac{\alpha}{2D}$

Here, $\gamma(k|l)$ represents the degree of belonging of the link l to the community k, and $\tau(n|l)$ represents whether the node n is the vertex of the link l.

$$\gamma(k|l) = \frac{\pi_k^{old} \prod_{n=1}^N [p_t(n|k)]^{\tau(n|l)}}{\sum_{k=1}^K \pi_k^{old} \prod_{n=1}^N [p_t(n|k)]^{\tau(n|l)}} \quad (\text{III}')$$

Here, $\gamma(k|l)$ and $\tau(n|l)$ in the above expressions respectively correspond to $\gamma_{lk}$ and $\tau_n^{(l)}$ in expression (I) described above.

The clustering calculation unit 144 performs calculations using expressions (I') to (III') described above in S16 and S20 in the processing procedure illustrated in FIG. 4 and iterates the calculations G times.

In the above-described example of a discrete Markov chain (expressions (I) to (III)), the probabilities of all of the nodes simultaneously transition at time intervals of 1 ($\Delta t = 1$), and therefore, the above-described issue of the probability switch arises. In the calculations based on a continuous-time master equation (expressions (I') to (III')), the probabilities of all of the nodes transition during each time interval of 1; however, the probabilities of all of the nodes do not simultaneously transition at the same timing but transition at different times in accordance with the very short time interval $\Delta t$. Therefore, the above-described issue of the probability switch is eliminated or reduced.

Simplified Calculation of Feature Representation of Subject from New Raw Data

Clustering of a bipartite network and generation of feature representations based on the clustering that are described above need iterative calculations of a Markov chain and so on, and therefore, take a long time for the calculations. Accordingly, after a clustering result has been obtained once, if clustering is performed each time new raw data (or a raw representation based on this data) is added by including the raw data in the bipartite network, calculations take a lot of time. A modification in which a clustering result that has been obtained once is used to simply calculate a feature representation for raw data that is added later is described below.

Figure 8:
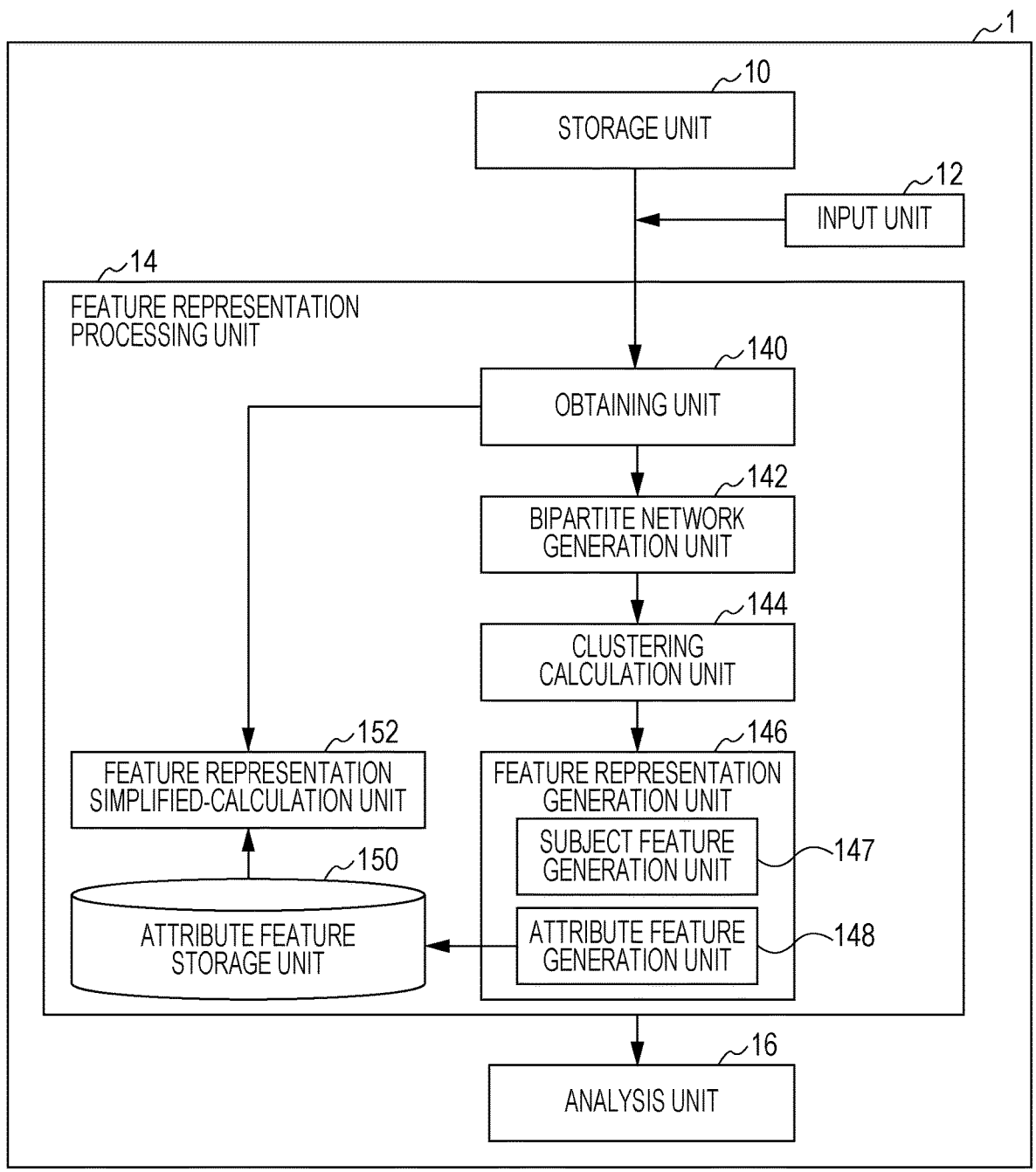
FIG. 8 is a diagram illustrating an example apparatus configuration according to a modification.

FIG. 8 illustrates a configuration of the information processing apparatus 1 according to this modification. In the information processing apparatus 1 according to this modification, the functions of an attribute feature storage unit 150 and a feature representation simplified-calculation unit 152 are added to the feature representation processing unit 14. Further, the feature representation generation unit 146 includes the functions of a subject feature generation unit 147 and an attribute feature generation unit 148. The remaining configuration is the same as that of the information processing apparatus 1 according to the above-described exemplary embodiment illustrated in FIG. 1.

The subject feature generation unit 147 generates information regarding each subject in a clustering result (for example, the information illustrated in FIG. 5) as a feature representation of the subject regarding clusters. The generated feature representation corresponds to the additional representation illustrated in FIG. 6. The feature representation generation unit 146 may output the additional representation as a new feature representation of the subject different from the raw representation, or may generate a combined representation (see FIG. 6) by combining the additional representation with the raw representation and output the combined representation as a new feature representation of the subject.

The attribute feature generation unit 148 generates, from a clustering result of each attribute obtained by the clustering calculation unit 144, for each attribute, a feature representation of the attribute. This feature representation needs to be information (for example, a vector representation) that indicates whether or not the attribute belongs to each cluster or indicates a degree to which the attribute belongs to each cluster (the value is 0 if the attribute does not belong to the cluster at all), as in the additional representation of a subject (see FIG. 6).

The attribute feature storage unit 150 stores data of the feature representation of each attribute generated by the attribute feature generation unit 148. Here, it is assumed that the feature representation of each attribute obtained by the clustering calculation unit 144 performing learning based on the above-described EM algorithm from a large amount of raw representation data has been stored in the attribute feature storage unit 150.

In a case where, regarding one or more subjects, raw representations are newly input to the information processing apparatus 1 after the learning, the feature representation simplified-calculation unit 152 calculates new feature representations about the subjects included in the raw representations newly input to the information processing apparatus 1 by using the feature representations of the attributes stored in the attribute feature storage unit 150.

The feature representation simplified-calculation unit 152 performs a calculation on the basis of expression 7 below.

$$p(k|\tau) = \Sigma_\omega p(k,\omega|\tau) = \Sigma_\omega p(k|\omega,\tau)p(\omega|\tau) \approx \Sigma_\omega p(k|\omega)p(\omega|\tau) \quad \text{expression 7}$$

$\tau$ represents a node on the "analysis subject side", and $\omega$ represents a node on the "feature attribute side".

Here, $\tau$ is a raw representation of a subject, and $\omega$ is a feature representation of an attribute obtained by performing learning. The left side of expression 7 indicates the probability of the cluster k (conditional probability) on the condition that the raw representation of the subject is a vector $\tau$. This conditional probability $p(k|\tau)$ may be regarded as a degree to which the subject T belongs to the cluster k and is substantially equal to the degree of belonging $\gamma(k|n)$, which indicates a degree to which the node n (corresponding to the subject $\tau$) belongs to the cluster k in the above-described exemplary embodiment. In this modification, the conditional probability $p(k|\tau)$ is regarded as a feature representation of the subject T based on the clustering result. Expression 7 indicates that the conditional probability $p(k|\tau)$ is substantially equal to the sum, for $\omega$, of the product of the probability $p(k|\omega)$ of the cluster k on the condition that the raw representation of the attribute is a vector $\omega$ and the probability $p(\omega|\tau)$ of the attribute $\omega$ on the condition that the raw representation of the subject is a vector $\tau$. Here, $p(k|\omega)$ may be regarded as a degree to which the attribute $\omega$ belongs to the cluster k, and is a feature representation of the attribute $\omega$ based on the clustering result. As the value of this feature representation, the feature representation of each attribute stored in the attribute feature storage unit 150 is available. Further, $p(\omega|\tau)$ needs to be calculated by normalizing the values of the attributes $\omega$ of the subject $\tau$ so that the total is equal to 1.

A specific example is used to give a description below. For example, a case is assumed where a raw representation of a subject $\tau$ is expressed by expression 8 below.

$$\tau = (0,0,1,0,0,1,0,1,0,0) \quad \text{expression 8}$$

$$p(\omega|\tau) = \left(0, 0, \frac{1}{3}, 0, 0, \frac{1}{3}, 0, \frac{1}{3}, 0, 0\right) \quad \text{expression 9}$$

When the vector of the raw representation of the subject $\tau$ is normalized, the probability $p(\omega|\tau)$ is calculated as expressed by expression 9 above.

Here, it is assumed that the feature representations of attributes $\omega_3$, $\omega_6$, and $\omega_8$, which respectively correspond to the third, sixth, and eighth components of the vector of the raw representation of the subject $\tau$ (feature representation stored in the attribute feature storage unit 150), are as follows. These feature representations correspond to the probability $p(k|\omega)$ in expression 7.

$\omega_3 = (0,0.1,0,0.4,0.5,0)$ $\omega_6 = (0,0.3,0,0,0.7,0)$ $\omega_8 = (0,0.2,0,0.1,0.7,0)$ In this case, the feature representation $p(k|\tau)$ of the subject $\tau$ is the sum, for $\omega$, of the product of $p(k|\omega)$ and $p(\omega|\tau)$ according to expression 7 and is calculated as follows.

$$\tau = \frac{1}{3} \times \omega_3 + \frac{1}{3} \times \omega_6 + \frac{1}{3} \times \omega_8$$

$$= \left(0, \frac{1}{5}, 0, \frac{1}{6}, \frac{19}{30}, 0\right)$$

As described above, according to this modification, the feature representations of attributes obtained as a result of learning are used to generate a new feature representation (a feature representation regarding clusters) of a subject represented by a raw representation that is input after the learning.

The exemplary embodiment of the present invention has been described above. The information processing apparatus 1 described above is implemented by causing a computer to execute a program that describes the above-described functions. The computer has a circuit configuration in which, hardware units, namely, a controller that controls a microprocessor, such as a CPU, memories (primary memories), such as a RAM and a ROM, and a fixed storage device, such as a flash memory, a solid state drive (SSD), or a hard disk drive (HDD), various input/output (I/O) interfaces, and a network interface that performs control for connection to a network, such as a local area network, are connected with one another via, for example, a bus. The program in which the specifics of processes of the functions are described is saved in the fixed storage device, such as a flash memory, over a network and so on and is installed on the computer. The program stored in the fixed storage device is loaded to the RAM and is executed by the microprocessor, such as a CPU, to thereby implement the functional module group described above.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for information processing, the process comprising:
    obtaining input data that represents attributes of each subject among subjects;
    generating a bipartite network which includes the subjects and the attributes included in the input data as nodes and in which a node that corresponds to each subject among the subjects is connected to a plurality of nodes that correspond to the attributes of the subject via links, such that a node of an attribute is not directly linked to another node of an attribute and is indirectly linked to the another node via a node of a common subject;
    performing clustering of a group of the nodes by performing iterative calculations of a stochastic process of transitions between the nodes via the links in the bipartite network, wherein the iterative calculations of the stochastic process include calculating a probability value of transitions from one node of an attribute to another node of an attribute via links in the bipartite network;
    after the clustering is completed, adding a new attribute feature to each subject based on a result of the clustering; and
    analyzing the subjects using the new attribute added to each subject.

2. The non-transitory computer readable medium according to claim 1, the process further comprising
    generating, for each subject among the subjects, subject cluster feature data that represents features of the subject from a clustering viewpoint by using a result of the performed clustering.

3. The non-transitory computer readable medium according to claim 2, the process further comprising
    generating, for each attribute among the attributes, attribute cluster feature data that represents features of the attribute from a clustering viewpoint by using a result of the performed clustering.

4. The non-transitory computer readable medium according to claim 3, the process further comprising
    generating, in a case where data that represents attributes of a new subject not included in the input data is input, feature data that represents features of the new subject from a clustering viewpoint by using the attribute cluster feature data of the attributes generated by using the result of the clustering performed for the input data.

5. The non-transitory computer readable medium according to claim 4, wherein
    in the performing of clustering, initial values of the nodes in the stochastic process are set so as to satisfy a condition that a sum total of initial values of a group of nodes that correspond to the subjects is substantially equal to a sum total of initial values of nodes that correspond to the attributes, and the set initial values of the nodes are used to perform the iterative calculations.

6. The non-transitory computer readable medium according to claim 4, wherein
    in the performing of clustering, as the iterative calculations of the stochastic process, calculations are performed by using a continuous-time model without using a discrete-time model.

7. The non-transitory computer readable medium according to claim 3, wherein
    in the performing of clustering, initial values of the nodes in the stochastic process are set so as to satisfy a condition that a sum total of initial values of a group of nodes that correspond to the subjects is substantially equal to a sum total of initial values of nodes that correspond to the attributes, and the set initial values of the nodes are used to perform the iterative calculations.

8. The non-transitory computer readable medium according to claim 3, wherein
    in the performing of clustering, as the iterative calculations of the stochastic process, calculations are performed by using a continuous-time model without using a discrete-time model.

9. The non-transitory computer readable medium according to claim 2, wherein
    in the performing of clustering, initial values of the nodes in the stochastic process are set so as to satisfy a condition that a sum total of initial values of a group of nodes that correspond to the subjects is substantially equal to a sum total of initial values of nodes that correspond to the attributes, and the set initial values of the nodes are used to perform the iterative calculations.

10. The non-transitory computer readable medium according to claim 2, wherein
    in the performing of clustering, as the iterative calculations of the stochastic process, calculations are performed by using a continuous-time model without using a discrete-time model.

11. The non-transitory computer readable medium according to claim 1, the process further comprising
    generating, for each attribute among the attributes, attribute cluster feature data that represents features of the attribute from a clustering viewpoint by using a result of the performed clustering.

12. The non-transitory computer readable medium according to claim 11, the process further comprising
    generating, in a case where data that represents attributes of a new subject not included in the input data is input, feature data that represents features of the new subject from a clustering viewpoint by using the attribute cluster feature data of the attributes generated by using the result of the clustering performed for the input data.

13. The non-transitory computer readable medium according to claim 12, wherein
    in the performing of clustering, initial values of the nodes in the stochastic process are set so as to satisfy a condition that a sum total of initial values of a group of nodes that correspond to the subjects is substantially equal to a sum total of initial values of nodes that correspond to the attributes, and the set initial values of the nodes are used to perform the iterative calculations.

14. The non-transitory computer readable medium according to claim 12, wherein
    in the performing of clustering, as the iterative calculations of the stochastic process, calculations are performed by using a continuous-time model without using a discrete-time model.

15. The non-transitory computer readable medium according to claim 11, wherein
    in the performing of clustering, initial values of the nodes in the stochastic process are set so as to satisfy a condition that a sum total of initial values of a group of nodes that correspond to the subjects is substantially equal to a sum total of initial values of nodes that correspond to the attributes, and the set initial values of the nodes are used to perform the iterative calculations.

16. The non-transitory computer readable medium according to claim 11, wherein
in the performing of clustering, as the iterative calculations of the stochastic process, calculations are performed by using a continuous-time model without using a discrete-time model.

17. The non-transitory computer readable medium according to claim 1, wherein
in the performing of clustering, initial values of the nodes in the stochastic process are set so as to satisfy a condition that a sum total of initial values of a group of nodes that correspond to the subjects is substantially equal to a sum total of initial values of nodes that correspond to the attributes, and the set initial values of the nodes are used to perform the iterative calculations.

18. The non-transitory computer readable medium according to claim 1, wherein
in the performing of clustering, as the iterative calculations of the stochastic process, calculations are performed by using a continuous-time model without using a discrete-time model.

19. The non-transitory computer readable medium according to claim 1, wherein
the subjects include documents, and
the attributes include words appearing in the documents.

20. An information processing apparatus comprising:
a processor that is programmed to:
obtain input data that represents attributes of each subject among subjects;
generate a bipartite network which includes the subjects and the attributes included in the input data as nodes and in which a node that corresponds to each subject among the subjects is connected to a plurality of nodes that correspond to the attributes of the subject via links, such that a node of an attribute is not directly linked to another node of an attribute and is indirectly linked to the another node via a node of a common subject;
perform clustering of a group of the nodes by performing iterative calculations of a stochastic process of transitions between the nodes via the links in the bipartite network, wherein the iterative calculations of the stochastic process include calculating a probability value of transitions from one node of an attribute to another node of an attribute via links in the bipartite network;
after the clustering is completed, add a new attribute feature to each subject based on a result of the clustering; and
analyze the subjects using the new attribute added to each subject.

21. An information processing method comprising:
obtaining input data that represents attributes of each subject among subjects;
generating a bipartite network which includes the subjects and the attributes included in the input data as nodes and in which a node that corresponds to each subject among the subjects is connected to a plurality of nodes that correspond to the attributes of the subject via links, such that a node of an attribute is not directly linked to another node of an attribute and is indirectly linked to the another node via a node of a common subject;
performing clustering of a group of the nodes by performing iterative calculations of a stochastic process of transitions between the nodes via the links in the bipartite network, wherein the iterative calculations of the stochastic process include calculating a probability value of transitions from one node of an attribute to another node of an attribute via links in the bipartite network;
after the clustering is completed, adding a new attribute feature to each subject based on a result of the clustering; and
analyzing the subjects using the new attribute added to each subject.

* * * * *